2,790,802

SUBSTITUTED TETRAHYDROPTERIDINES AND METHOD OF PREPARING THE SAME

John A. Brockman, Jr., and Marvin J. Fahrenbach, Pearl River, N. Y., assignors to American Cyanamid Company, New York, N. Y., a corporation of Maine No Drawing. Application May 6, 1954,
Serial No. 428,141

6 Claims. (Cl. 260—251.5)

This invention relates to new substituted pteridines having biological activity and to methods of preparation thereof.

In 1947 O'Dell et al., J. Am. Chem. Soc., volume 69, page 250, described the catalytic reduction of substituted pteridines such as pteroylglutamic acid. It has subsequently been found that the reduction of pteroylglutamic acid will produce di- or tetrahydropteroylglutamic acid. In 1948 Sauberlich and Baumann, J. Biol. Chem., 176, page 165, recognized the existence of a substance that stimulates the growth of *Leuconostoc citrovorum* in a synthetic medium. This substance has subsequently been found to be, in its most active form, 5-formyl-5,6,7,8-tetrahydropteroylglutamic acid.

We have now found that a further substance having high biological activity can be prepared by the condensation of 5,6,7,8-tetrahydropteroylamino acids with formaldehyde. The new products, while somewhat unstable, are believed to be in their most stable forms, 5-hydroxymethyl-5,6,7,8-tetrahydropteroylamino acids.

In the presence of water these products, however, may exist in one or more of the following forms:

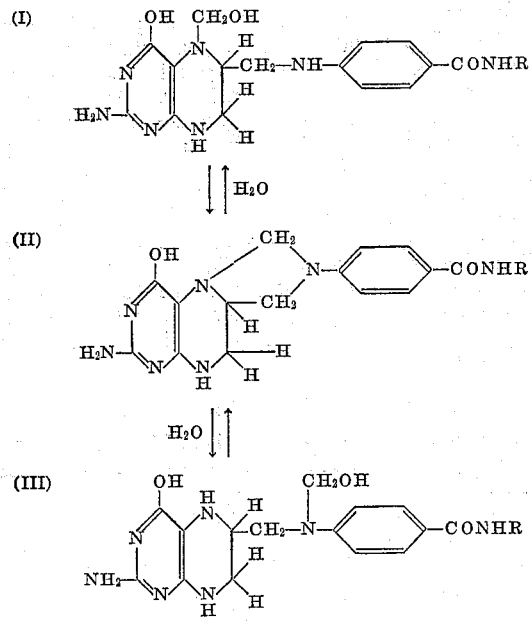

In the above formulae NHR is an amino acid radical. It is obvious from these formulae that from the bridge methylene compound II, compounds I and III are obtained by the addition of water.

The intermediates used in the process of the present invention, namely, 5,6,7,8-tetrahydropteroylamino acids, can be obtained by methods described in the chemical literature which usually employ the catalytic reduction of pteroylamino acids.

The 5,6,7,8-tetrahydropteroylamino acids are reacted with formaldehyde to prepare the compounds of the present invention. The quantity of formaldehyde is not critical as shown hereinafter in the examples. In carrying out the present process, when at least one mole of formaldehyde is used, the desired product is obtained as well as under conditions wherein several moles of formaldehyde are used.

In carrying out the present process we have found that glacial acetic acid as a solvent gives good results. Other solvents, however, can be used such as aqueous sodium bicarbonate, aqueous potassium bicarbonate, dilute aqueous sodium hydroxide, etc. The reaction will take place at temperatures from 0° C. to 100° C. It is usually desirable to carry out the reaction at room temperature since this temperature is easily maintained and the desired product is obtained within a reasonable length of time.

The 5 - hydroxymethyl - 5,6,7,8 - tetrahydropteroylamino acids of the present invention are involved in the metabolism of choline, amino acids such as serine, glycine and methionine, and nucleic acid constituents such as thymine and thymidine. These products will reverse the toxic effects of folic acid antagonists such as aminopterin (N - [4 - {(2,4 - diamino - 6 - pyrimido[4,5 - *b*]-pyrazyl)methylamino}-benzoyl]glutamic acid). The present compounds are active for the growth of *Leuconostoc citrovorum* 8081, *Streptococcus faecalis* or *Lactobacillus casei*.

The following examples describe in detail the preparation of representative 5 - hydroxymethyl - 5,6,7,8 - tetrahydropteroylamino acids.

Example 1

To a standard Ogg-Cooper micro hydrogenation apparatus were charged ten parts by volume of glacial acetic acid and 0.015 part of platinum oxide. The catalyst was reduced by stirring overnight at room temperature under an atmosphere of hydrogen. Then 0.015 part "real" pteroyl-L-glutamic acid were added. Reduction of the pteroylglutamic acid was carried out at 21°–22° C. for eight hours and 15 minutes, during which time approximately 2.3 molar proportions of hydrogen were consumed. The catalyst was separated by centrifugation under nitrogen, and aliquots of the colorless supernatant solution (1.67 parts by volume, containing 0.0025 part of 5,6,7,8 - tetrahydropteroylglutamic acid) were transferred into five separate flasks, four of which are used as starting material in the examples hereinafter, previously flushed with nitrogen. The glacial acetic acid was removed from the first flask by evacuating overnight in a vacuum desiccator over potassium hydroxide. The white residue of 5,6,7,8 - tetrahydropteroylglutamic acid was redissolved under nitrogen atmosphere in 0.1 part by volume of oxygen-free water plus 2.4 parts by volume of sodium bicarbonate solution containing 4 molar equivalents of sodium bicarbonate.

Example 2

To the second aliquot of 5,6,7,8 - tetrahydropteroylglutamic acid in 1.67 parts of glacial acetic acid from Example 1 was added 1.1 molar proportions of formaldehyde in 0.1 part by volume of glacial acetic acid. The resultant mixture was allowed to stand for three hours at room temperature under an atmosphere of nitrogen; then the glacial acetic acid was removed under reduced pressure and the residue, 5 - hydroxymethyl - 5,6,7,8-tetrahydropteroylglutamic acid, dissolved in dilute sodium bicarbonate solution as described in Example 1.

Example 3

The third aliquot was treated by the same procedure as in Example 2 above, except that an 11 molar proportion of formaldehyde in 0.1 part by volume of glacial acetic acid was employed. The product obtained was the same as that of Example 2.

*Example 4*

The fourth aliquot of 5,6,7,8-tetrahydropteroylglutamic acid in 1.67 parts by volume of glacial acetic acid was evaporated to dryness under reduced pressure over potassium hydroxide as described in Example 1 above. The white residue was dissolved under an atmosphere of nitrogen in 2.4 parts by volume of oxygen-free sodium bicarbonate solution containing four molar equivalents of sodium bicarbonate. The 5 - hydroxymethyl - 5,6,7,8 - tetrahydropteroylglutamic acid was prepared from this solution by adding 1.1 molar proportions of formaldehyde as a solution in 0.1 part by volume of oxygen-free water.

*Example 5*

The final aliquot of 5,6,7,8 - tetrahydropteroylglutamic acid in 1.67 parts by volume of glacial acetic acid was treated as in Example 4 above, except 11 molar proportions of formaldehyde in 0.1 part by volume of oxygen-free water were employed. The product obtained was identical with that of Example 4.

The solutions obtained from Examples 1 through 5 were assayed microbiologically for "citrovorum factor" activity with *Leuconostoc citrovorum* 8081. The microbiological technique has been previously described (Sauberlich, H. E., and Baumann, C. A., J. Biol. Chem., 176, 165 (1948); Broquist, H. P., Stokstad, E. L. R., and Jukes, T. H., J. Biol. Chem. 185, 399 (1950)). The samples were diluted with freshly boiled, cooled sterile water and added aseptically to sterile cooled medium. The growth response of *Leuconostoc citrovorus* to these compounds is shown in the following table:

RESPONSE OF *Leuconostoc Citrovorum* 8081 TO FOLIC ACID COMPOUNDS

| Amount of compound tested per 2.0 ml. volume, mγ | Leucovorin (as anhydrous acid) | Example 1 | Example 2 | Example 3 | Example 4 | Example 5 |
|---|---|---|---|---|---|---|
| | | Optical density readings following 18 hours' incubation | | | | |
| 0.1 | 0.28 | 0.0 | .12 | .14 | .11 | .07 |
| | 0.29 | 0.07 | .12 | .27 | .10 | .07 |
| 1.0 | 1.00 | 0.0 | .31 | .39 | .22 | .24 |
| | 1.01 | 0.09 | .31 | .43 | .21 | .23 |
| 10.0 | | .29 | .61 | .65 | .58 | .57 |
| | | .29 | .64 | .75 | .53 | .65 |

In Example 1 the product gave a significant growth response at the 10 mγ level, confirming earlier observations that 5,6,7,8 - tetrahydropteroylglutamic acid has citrovorum activity. Examples 2, 3, 4 and 5 were all at least 10 times as active as Example 1 indicating that a new biologically active substance had been prepared. Example 3 appeared to be the most active as it gave a significant growth response at the 0.1 mγ level. The growth response curve, obtained by plotting the growth response (optical density) vs. concentration of product tested, of Examples 2, 3, 4 and 5 resembled 1 in being a flat curve; whereas the growth response curve to leucovorin (5 - formyl - 5,6,7,8 - tetrahydropteroylglutamic acid) was very steep. These curves serve to differentiate products of Examples 1, 2, 3, 4 and 5 from leucovorin.

We claim:

1. Compounds of the group consisting of those having the general formula:

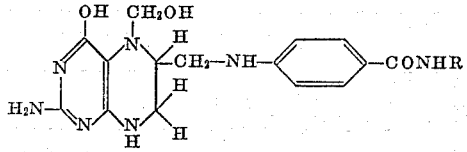

in which NHR is an amino acid radical of the group consisting of aspartic acid, glutamic acid, and alpha-amino adipic acid and cationic salts thereof.

2. 5 - hydroxymethyl - 5,6,7,8 - tetrahydropteroylglutamic acid.

3. A process of preparing compounds having the formula:

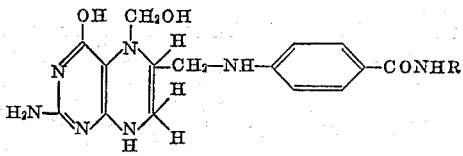

in which NHR is an amino acid radical of the group consisting of aspartic acid, glutamic acid, and alpha-amino adipic acid which comprises subjecting the corresponding 5,6,7,8 - tetrahydropteroylamino acid to the action of formaldehyde.

4. A method of preparing compounds having the general formula:

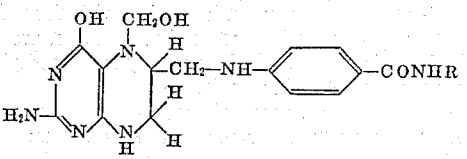

in which NHR is a member of the group consisting of aspartic acid, glutamic acid, and alpha-amino adipic acid which comprises reacting the corresponding 5,6,7,8 - tetrahydropteroylamino acid with formaldehyde in the presence of a solvent of the group consisting of acetic acid, aqueous alkali metal bicarbonate, and dilute aqueous sodium hydroxide solutions.

5. A method of preparing 5 - hydroxymethyl - 5,6,7,8- tetrahydropteroylglutamic acid which comprises reacting 5,6,7,8 - tetrahydropteroylglutamic acid with formaldehyde in the presence of acetic acid.

6. A process which comprises the step of condensing 5,6,7,8 - tetrahydropteroylglutamic acid with formaldehyde in the presence of an aqueous alkali metal bicarbonate solution.

References Cited in the file of this patent

Roth et al.: J. Am. Chem. Soc., 74: 3247–3252 (1952).
Cosulich et al.: J. Am. Chem. Soc., 74: 3252–3263 (1952).